April 29, 1930.                     C. F. JENKINS                     1,756,689
SYNCHRONOUS MOTOR COUPLING
Filed Oct. 30, 1925
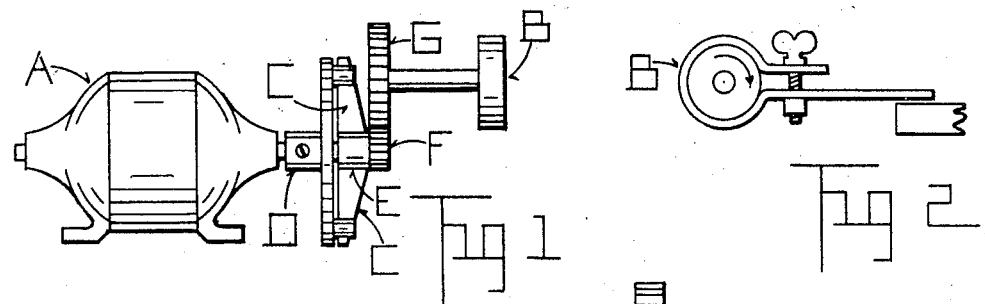
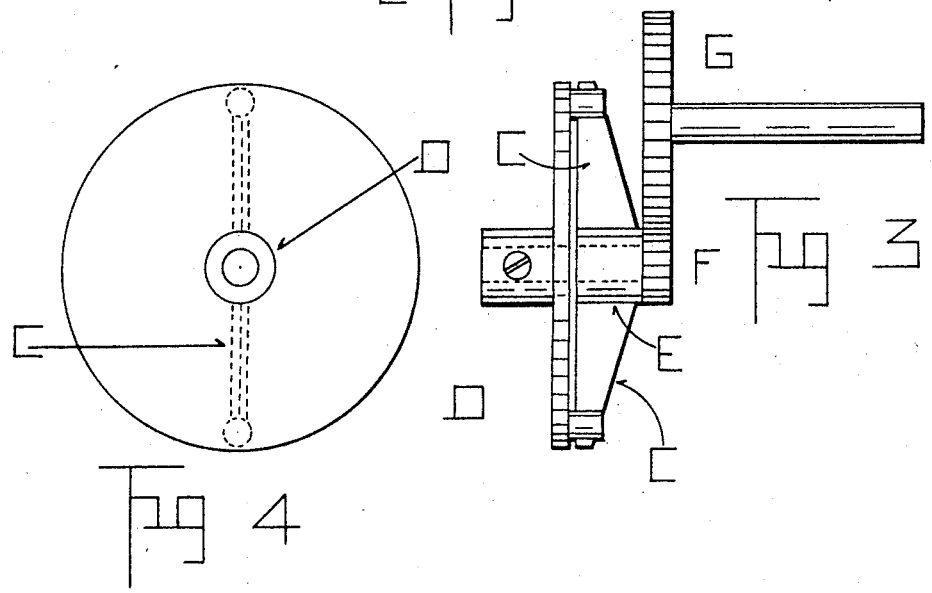
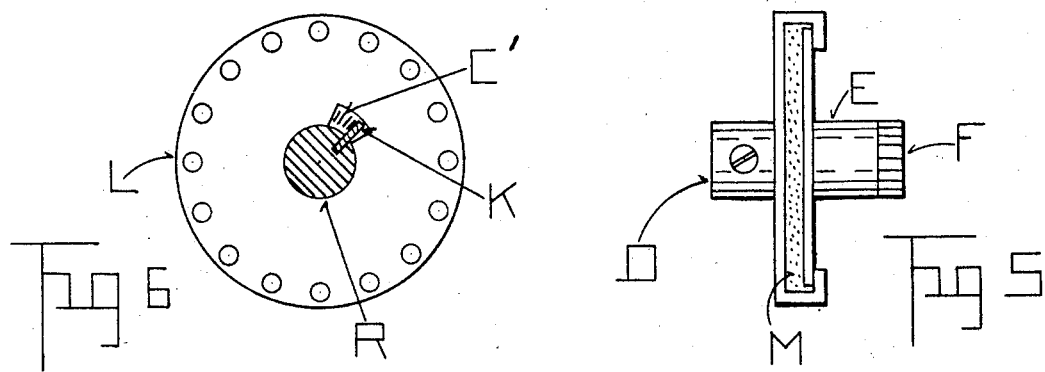
Witness;
Florence M. Anthony.
Inventor
C Francis Jenkins Patented Apr. 29, 1930

1,756,689

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

SYNCHRONOUS-MOTOR COUPLING

Application filed October 30, 1925. Serial No. 65,866.

This invention relates to electric motors, and its principal object is to provide means whereby a synchronous motor can start and get into synchronism with its full load.

Heretofore, as is well known, a synchronous motor will not get into step if it is carrying the maximum load it can carry after it is helped into step. That is, a synchronous motor will pull a much heavier load when helped by another motor to get into phase with the current than it will pick up and get into phase unaided.

For example, heretofore the motor used by applicant in rotating the radio vision apparatus of Patent No. 1,544,156 and No. 1,530,463, must be helped by another motor to get into step, but thereafter is able not only to carry the full load but rotate the booster motor also after the current has been cut off of the latter.

The principal object of this invention is, therefore, to provide means whereby a synchronous motor may start, and carry on into step with the current the maximum load of which it is capable.

With these and other objects in view the invention consists in the novel method hereinafter disclosed and particularly pointed out in the claim.

In Fig. 1 of the drawings the invention is shown as a coupling between a synchronous motor and its load; Fig. 2 an end view showing the load; Fig. 3 an enlarged view; and Fig. 4 an end view of the coupling; Fig. 5 another form of a similar coupling; and Fig. 6 the invention built into the motor.

In all the figures like symbols refer to like parts, in which A is a motor elastically coupled to a load B. The elastic coupling is made up of a flanged hub D rigidly fastened on the motor shaft, and a loose hub E with a gear F thereon, the loose hub tractively connected to the driving hub D by spring blades C.

The gear F engages with gear G which latter is mounted on a shaft upon the other end of which is a load B, illustratively shown (in Fig. 2) as a brake.

In Fig. 6 the "squirrel-cage" rotor L is loosely mounted on the shaft R, rotary displacement being limited by the key K. A spring C' is inserted between the key and the facing keyway wall, to give the required latitude of movement between the rotor L and the load B.

It is possible to leave out the flexibility of the coupling, as for example, by removing the coil spring C' between the key and one side of the keyway, as shown in Fig. 6. However, as the motor then pounds on the load unnecessarily, I prefer to put a friction member somewhere between the rotor and the load, perhaps as shown in Fig. 5 where D is the rigid hub and E the loose hub with a cork insert M therebetween packed tight enough to make a drag-coupling.

In operation it has been found that a synchronous motor has such a "jerky" current with respect to the inertia of its load that the motor cannot get into step before the phase passes on and leaves a partial opposing phase.

If, however, an elastic or semi-loose coupling be provided between the motor and its load to provide the unevenness of movement and semi-opposition of the elements involved until the motor pulls the load up to synchronous speed, then the difficulty is overcome.

By brake test on several motors it has been found that the motor with a flexible coupling will carry on into step more than twice the load with a rigid coupling.

This method permits a semi-loose coupling between the rotor L and the shaft R, because the keyway in the rotor is wider than the key in the shaft, so that movement therebetween is free for a little way before the shaft is rigidly driven by contact between the key and the keyway, and this is what applicant means by "semi-loose" coupling.

What I claim, is—

A synchronous motor structure comprising a rotor, a shaft on which said rotor is supported, and means for positively limiting the rotary movement of the rotor with respect to said shaft including a keyway carried by the rotor, a cooperating key carried by the shaft, and yieldable means between said key and said keyway.

In testimony whereof I have affixed my signature.

CHARLES FRANCIS JENKINS.